United States Patent
Machani (10) Patent No.: US 10,289,835 B1
(45) Date of Patent: May 14, 2019

(54) TOKEN SEED PROTECTION FOR MULTI-FACTOR AUTHENTICATION SYSTEMS

(71) Applicant: EMC Corporation, Hopkinton, MA (US)

(72) Inventor: Salah Machani, Toronto (CA)

(73) Assignee: EMC IP Holding Company LLC, Hopkinton, MA (US)

(*) Notice: Subject to any disclaimer, the term of this patent is extended or adjusted under 35 U.S.C. 154(b) by 210 days.

(21) Appl. No.: 15/180,284

(22) Filed: Jun. 13, 2016

(51) Int. Cl.
G06F 21/45 (2013.01)
H04L 9/08 (2006.01)
H04L 29/06 (2006.01)

(52) U.S. Cl.
CPC .......... G06F 21/45 (2013.01); H04L 9/085 (2013.01); H04L 9/0894 (2013.01); H04L 63/0428 (2013.01); H04L 63/083 (2013.01); H04L 63/0861 (2013.01); H04L 2463/082 (2013.01)

(58) Field of Classification Search
None
See application file for complete search history.

(56) References Cited

U.S. PATENT DOCUMENTS

| | | | | |
|---|---|---|---|---|
| 8,307,210 B1* | 11/2012 | Duane | ........... | H04L 9/0897 380/42 |
| 9,667,416 B1* | 5/2017 | Machani | ........... | H04L 9/0822 |
| 9,749,314 B1* | 8/2017 | Triandopoulos | .... | H04L 63/0838 |
| 9,954,680 B1* | 4/2018 | Machani | ........... | H04L 9/085 |
| 2003/0046202 A1* | 3/2003 | Knapp | ........... | G06Q 20/00 705/35 |
| 2007/0174614 A1* | 7/2007 | Duane | ........... | G06F 21/31 713/168 |
| 2008/0263363 A1* | 10/2008 | Jueneman | ........... | G06F 21/32 713/184 |
| 2009/0006858 A1* | 1/2009 | Duane | ........... | G06F 21/34 713/185 |
| 2012/0072723 A1* | 3/2012 | Orsini | ........... | G06F 21/6209 713/165 |

(Continued)

OTHER PUBLICATIONS

Doherty et al., "Dynamic Symmetric Key Provisioning Protocol (DSKPP)," Internet Engineering Task Force: Standards Track, RFC 6063, Dec. 2010, pp. 1-104, ISSN: 2070-1721.

(Continued)

Primary Examiner — Samson B Lemma
Assistant Examiner — Carlos E Amorin
(74) Attorney, Agent, or Firm — BainwoodHuang (57) ABSTRACT

New techniques are disclosed for protecting a token seed in a multifactor authentication system. A personal identification number is used to derive a fixed share, and the token seed is split, using a secret sharing technique, into a set of three shares made up of the fixed share, a remote share, and a local share, such that the token seed can only be reconstructed using any two of the three shares. The remote share is stored on a remote authentication server, and an encrypted version of the local share is stored on the user device. The remote share may be encrypted by performing a key wrapping operation on the remote share using the local share, and then storing the encrypted version of the remote share on the remote authentication server. The token seed, fixed share, remote share and local share may then be deleted from the user device.

17 Claims, 5 Drawing Sheets

(56) References Cited

U.S. PATENT DOCUMENTS

2016/0149873 A1* 5/2016 Dickinson ............... G06F 21/31
713/171
2016/0366106 A1* 12/2016 Smith ................. H04L 63/0428

OTHER PUBLICATIONS

Emura et al., "Ideal Secret Sharing Schemes with Share Selectability," International Conference on Information and Communication (ICICS) 2011, pp. 143-157, LNCS 7043, Springer-Verlag Berlin Heidelberg (2011).
Kaliski et al., "PKCS #5: Password-Based Cryptography Specification Version 2.0," Network Working Group: Informational, RFC 2898, Sep. 2000, pp. 1-33, The Internet Society (2000).
Nystroem, "Cryptographic Token Key Initialization Protocol (CT-KIP) Version 1 .0 Revision 1," Network Working Group: Informational, RFC 4758, Nov. 2006, pp. 1-54, The IETF Trust (2006).
Percival et al., "The scrypt Password-Based Key Derivation Function," Network Working Group: Informational, May 2015, pp. 1-13, The IETF Trust (2015).
Rivest, R., "How to Share a Secret," Communications of the ACM, Nov. 1979, pp. 612-613, vol. 22, No. 11, ACM (1979).
"AES Key Wrap Specification" National Institute of Standards and Technology, << http://csrc.nist.gov/groups/ST/toolkit/documents/kms/key-wrap.pdf.>> Nov. 16, 2001, pp. 1-23.
"Request for Review of key Wrap Algorithms," International Association of Cryptologic Research, << https://eprint.iacr.org/2004/340.pdf>> Nov. 2004, pp. 1-17, ASC X9, Inc.

* cited by examiner

TOKEN SEED PROTECTION FOR MULTI-FACTOR AUTHENTICATION SYSTEMS

BACKGROUND

As it is generally known, multi-factor authentication provides user identification based on the combination of at least two different components: i) something that the user possesses, and ii) something that the user knows. For example, something the user knows may be a personal identification number (PIN), while something that the user possesses may be a software or hardware based security token assigned to a user, that generates a current "token code" at fixed intervals using a built-in clock and a special key known as the "token seed". The token seed is different for each security token, and accordingly is different for each user. A copy of the token seed must also be stored in a corresponding authentication server. In order to be authenticated through the authentication server, e.g. to gain access to a secure network resource from a user device, the user must provide, to the authentication server, the current token code generated using the token seed for the user's security token at the current time. The server authenticates the user at least in part by computing the current token code that the user's security token is supposed to be generating at that moment in time, using the server's copy of the unique token seed assigned to the user's security token, and comparing the current token code computed at the server to the token code received from the user system.

In one example, a token seed for a software security token located in a user device (e.g. in a user's mobile phone) may first be generated in the authentication server, and then transmitted to the user device using a secure transport mechanism. In another example, the user device and the authentication server may generate the token seed collaboratively, without having to exchange the token seed over the network, using a cryptographic token key initialization protocol such as RSA Laboratories' Cryptographic Token Key Initialization Protocol (CT-KIP), or the Dynamic Symmetric Key Provisioning Protocol (DSKPP) described in Request for Comments (RFC) 6063 of the Internet Engineering Task Force (IETF).

After the token seed is present in the user device with the security token, the user can authenticate to a secure network resource from the user device, e.g. by providing their username, and both i) the current token code being generated by the token at that moment, and ii) their secret personal identification number (PIN). The generated token code and the PIN provided by the user may be combined to form a one-time passcode that is transmitted with the user's username to the authentication server. The authentication server then authenticates the user based on the data received from the client, in significant part by computing the current token code that the user's token is supposed to be generating at that moment in time using the server's copy of the token seed, and then comparing the current token code value computed on the server to the token code value received from the user device. The authentication server may also verify a PIN received from the user device.

In order for a multi-factor authentication system that employs a security token to provide secure user identification, it is important that the token seed be protected from exposure to malicious parties. This consideration is highlighted when the token seed is stored on a user device such as a mobile phone, which has a significant risk of theft or loss.

SUMMARY

In previous systems, the complete token seed was stored on the user device in a local store protected by password-based encryption, or by some other device native protection method. Unfortunately, native device protection methods can be disabled by the user, and password based encryption typically does not allow for flexibility with regard to using biometrics. Moreover, if the user device is wiped or replaced, the token seed stored on the user device will be lost.

To address these and other shortcomings of previous approaches, new techniques are disclosed herein for protecting a token seed in a multifactor authentication system. The disclosed techniques may be embodied to include receiving a personal identification number on a user device from a user of the user device, deriving a fixed share from the received personal identification number using a key derivation function, and then splitting the token seed, using a secret sharing technique, into a set of three shares made up of the fixed share, a remote share, and a local share, such that the token seed can only be reconstructed using any two of the three shares. The remote share may then be stored on a remote server, and an encrypted version of the local share may be stored on the user device (e.g. a wrapped version of the local share generated using a key wrapping function and a key wrapping key may be stored on the user device). Storing the remote share on the remote server may include generating an encrypted version of the remote share by performing a key wrapping operation on the remote share using the local share, and then storing the encrypted version of the remote share on the remote server. All copies of the token seed, fixed share, remote share and local share may then be deleted from the memory of the user device.

After the token seed has been split, and the token seed, fixed share, remote share and local share have all been deleted from the memory of the user device, a current token code may be generated by reconstructing the token seed differently depending on whether the user device is currently online or offline. Accordingly, in response to a request for a current token code, the disclosed system may first determine whether the user device is online or offline. Then, in response to detecting that the user device is offline, the user device may reconstruct the token seed on the user device by inputting the personal identification number from the user of the user device, deriving the fixed share from the input personal identification number using the key derivation function, and retrieving the encrypted version of the local share. The local share may then be generated by decrypting the encrypted version of the local share, and the token seed reconstructed using the fixed share and the local share. A current token code may then be generated using the reconstructed token seed and a current time.

In response to detecting that the user device is online, the token seed may be reconstructed on the user device by inputting a biometric sample from the user of the user device, and, in response to the biometric sample matching a biometric template for the user of the user device, establishing a secure communication connection between the user device and the remote server using a private key of the user device. The encrypted version of the remote share may then be retrieved from the remote server over the secure communication connection between the user device and the server, and then decrypted on the user device. The user device may then retrieve the encrypted version of the local share, decrypt the encrypted version of the local share, and reconstruct the token seed using the remote share and the local share. A current token code may then be generated using the reconstructed token seed and a current time.

In response to receiving an indication that the user has forgotten their personal identification number, the disclosed system may enable the user to provide a new personal identification number by inputting a biometric sample from the user of the user device, and in response to the biometric sample matching a biometric template for the user of the user device, establishing a secure communication connection between the user device and the remote server using the private key of the user device. The user device may then retrieve the encrypted version of the remote share from the remote server over the secure communication connection between the user device and the server, and then decrypt the encrypted version of the remote share. The user device may also retrieve the encrypted version of the local share and decrypt the encrypted version of the local share. The user device may then reconstruct the token seed using the remote share and the local share. The user device may then prompt the user for, and receive from the user, a new personal identification number, and derive a new fixed share from the new personal identification number using the key derivation function. The reconstructed token seed may then be split, using the secret sharing technique, into a set of three shares made up of the new fixed share, a new remote share, and a new local share, wherein the token seed can only be reconstructed using any two of the resulting three shares. The user device then stores the new remote share on the remote server, stores an encrypted version of the new local share on the user device, and deletes the token seed, the fixed share, remote share, and local share from its memory.

Embodiments of the disclosed techniques may provide significant advantages over previous approaches. For example, the disclosed techniques may be embodied such that they do not rely on device native methods of protecting the token seed on the user device, which can be disabled by a user. Also, the disclosed techniques may be embodied such that they do not strictly rely on password-based encryption, and accordingly may provide the capability to use biometric based techniques. Moreover, because the token seed is not stored on the user device, theft of the user device is less likely to result in the token seed being compromised. In addition, the token seed can be conveniently reconstructed even in situations where the user device is offline, is wiped or replaced, and/or when the user has forgotten or simply wishes to reset their personal identification number.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that such embodiments are provided by way of example to illustrate various features and principles of the invention, and that the scope of the invention is broader than the specific examples of embodiments disclosed herein.

Figure 1:
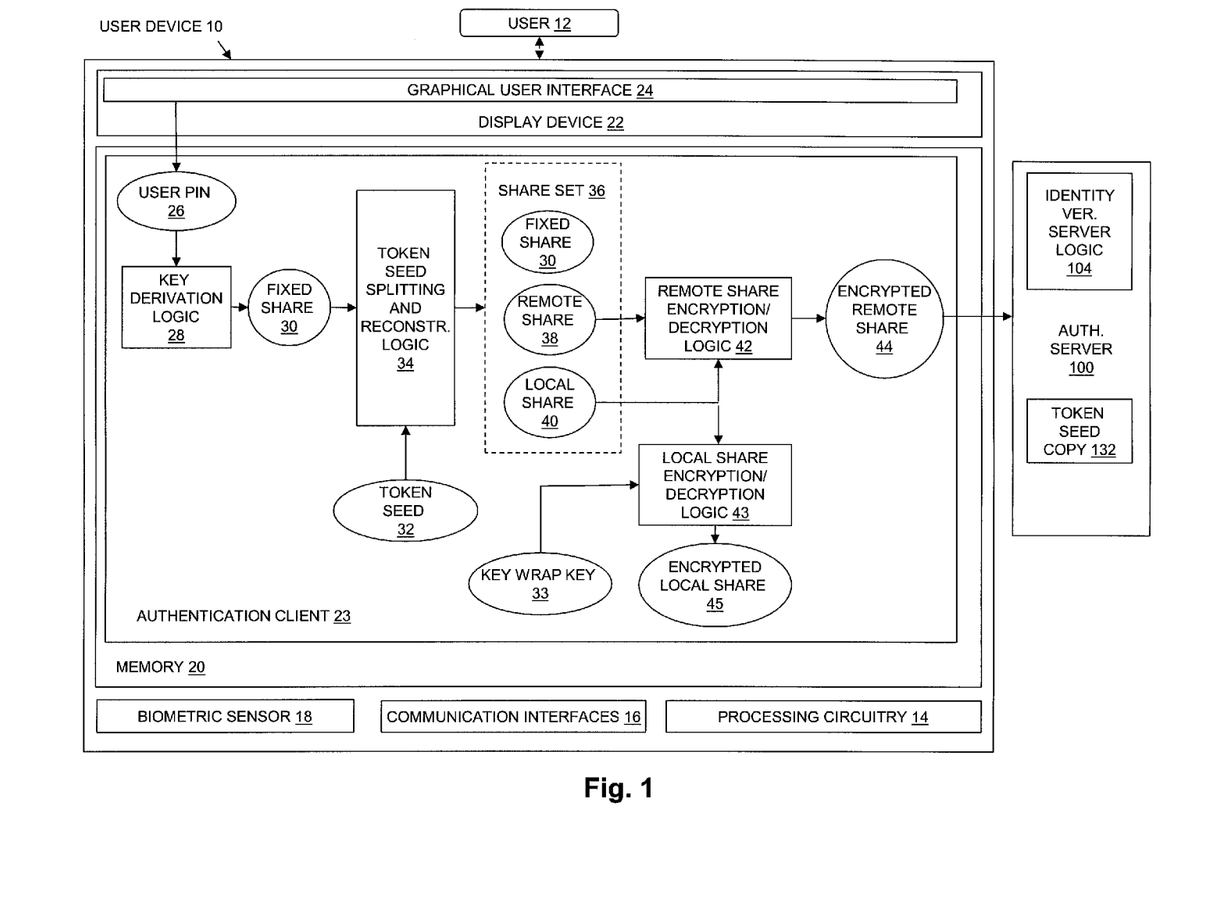
FIG. 1 is a block diagram showing an example of components in an illustrative embodiment operating to protect a token seed.

FIG. 1 is a block diagram showing an example of components in an illustrative embodiment operating to protect a token seed, as may be used in a multifactor authentication system. The User Device 10 shown in FIG. 1 may consist of or include any specific type of computerized electronic device, including but not limited to a desktop computer, a mobile device such as a laptop computer, tablet computer, smartphone, hardware security token, and/or personal digital assistant (PDA), and/or another specific type of electronic device having electronics, software, one or more sensors, and network connectivity that enables the collection and exchange of data.

In the illustrative example of FIG. 1, User Device 10 includes Processing Circuitry 14, Communication Interfaces 16, a Biometric Sensor 18, Memory 20, and a Display Device 22. Display Device 22 may include or consist of any specific type of output device operable to present information in visual form, such as a computer monitor, or any other type of electronic visual display. The Communication Interfaces 16 may, for example, include one or more network adapters and/or network interface cards for converting electronic and/or optical signals received over a computer network into electronic form for use by User Device 10. The Communication Interfaces 16 enable User Device 10 to communicate with Authentication Server 100 over one or more computer networks. The Processing Circuitry 14 may, for example, include or consist of one or more microprocessors, e.g. central processing units (CPUs), multi-core processors, chips, and/or assemblies.

The Memory 20 may, for example, include or consist of any type of computer memory, such as volatile memory (e.g., RAM), or non-volatile memory (e.g. NVRAM), and/or semiconductor, magnetic or optical secondary computer storage (e.g. solid state, magnetic, or optical drives), and/or another computer readable medium, for storing program code executable on Processing Circuitry 14, and for storing data operated on by such program code. Program code executable on User Device 10 is shown including an Authentication Client 23, which may include various specific program components and/or modules, etc. For purposes of explanation with reference to FIG. 1, the components of Authentication Client 23 are shown to include Key Derivation Logic 28, Token Seed Splitting and Reconstruction Logic 34, Remote Share Encryption/Decryption Logic 42, and Local Share Encryption/Decryption Logic 42.

Those skilled in the art will recognize that while certain software constructs are specifically shown and described for purposes of explanation, the Memory 20 may additionally or alternatively include other software constructs, which are not shown in FIG. 1, such as an operating system, various applications, and/or other processes.

Biometric Sensor 18 may consist of or include a digital camera or digital video camera operable to capture image or video data (e.g. one or more images of a user's face, fingerprint, eye or eye region, palm, etc.), a microphone operable to capture a recording of a user's voice, and/or any other specific type of biometric sensor operable to capture biometric samples.

Authentication Server 100 may be any specific type of server system operable to perform a multi-factor authentication operation to authenticate a user of User Device 10, based at least in part on a current token code received from User Device 10, before allowing the user of User Device 10 to access a secure resource. The secure resource may be located on or provided by a computer that is located remotely from User Device 10, but that is communicable with User Device 10 over one or more computer networks, such as Authentication Server 100. Examples of secure resources to which access may be restricted, and that may accordingly require user authentication by Authentication Server 100 may include, without limitation, Web sites, online services, application programs, confidential or proprietary data, cloud computing resources, computer systems, and/or any other type of secure resource for which authentication may be required prior to access. Authentication Server 100 may be embodied to include or consist of one or more physical server computer systems, or alternatively as one or more virtual private servers (VPSs), such as one or more cloud servers or the like.

During operation of the User Device 10, Authentication Client 23 receives a personal identification number, shown by User PIN 26, from a user of User Device 10, e.g. User 12. User 12 may, for example, be an owner or other authorized user of User Device 10. User PIN 26 may, for example, be received by Authentication Client 23 from a user of User Device 10 through a graphical user interface generated in whole or in part by Authentication Client 23, shown in FIG. 1 by the Graphical User Interface 24 displayed on Display Device 22. For example, in response to Token Seed 32 being received by User Device 10 from Authentication Server 100, or in response to Token Seed 32 being generated in User Device 10, Authentication Client 23 may generate a prompt that is displayed in Graphical User Interface 24, that requests that User 12 enter their personal identification number into Graphical User Interface 24, so that the disclosed techniques can be applied to protect Token Seed 32.

Token Seed 32 may be loaded into or generated by the User Device 10 using any appropriate technique, such that a copy of Token Seed 32 is also loaded onto Authentication Server 100. For example, Token Seed 32 may be initially generated on Authentication Server 100, and then transmitted to the User Device 10 using a secure transport mechanism. In another example, User Device 10 and Authentication Server 100 may generate Token Seed 32 collaboratively using a cryptographic token key initialization protocol such as RSA Laboratories' Cryptographic Token Key Initialization Protocol (CT-KIP), or the Dynamic Symmetric Key Provisioning Protocol (DSKPP) described in Request for Comments (RFC) 6063 of the Internet Engineering Task Force (IETF).

Regardless of the specific technique used to generate Token Seed 32 on User Device 12, a copy of Token Seed 32, shown as Token Seed Copy 132 in FIG. 1, is also present on Authentication Server 100. Identity Verification Server Logic 104 in Authentication Server 100 may consist of one or more software processes executing on Authentication Server 100, and is operable to support authentication of User 12 by generating a current token code using Token Seed Copy 132 at the time a token code generated using Token Seed 32 is received from User Device 10. Identity Verification Server Logic 104 compares the token code received from User Device 10 with the current token code generated on Authentication Server 100 using Token Seed Copy 132, in order to determine whether the received token code is the correct token code for the current time, for example as at least part of a process for authenticating User 12, prior to allowing User 12 to access a secure resource.

Further during operation of the components shown in FIG. 1, User PIN 26 is passed to Key Derivation Logic 28, and Key Derivation Logic 28 derives Fixed Share 30 from User PIN 26 using a key derivation function. For example, Key Derivation Logic 28 may derive Fixed Share 30 from User PIN 26 using a key derivation function such as the PBKDF2 key derivation function described in "PKCS #5: Password-Based Cryptography Specification Version 2.0", published in September 2000 by the Internet Engineering Task Force (IETF) in Request for Comments (RFC) 2898, all disclosures of which are hereby included herein by reference. In another example, Key Derivation Logic 28 may derive Fixed Share 30 from User PIN 26 using a key derivation function such as the SCRYPT key derivation function described in "The SCRYPT Password-Based Key Derivation Function", published in May 2015 by the Internet Engineering Task Force (IETF) as "The SCRYPT Password-Based Key Derivation Function: draft-josefsson-scrypt-kdf-03", all disclosures of which are hereby included herein by reference. Alternatively, any other appropriate key derivation function may be used by Key Derivation Logic 28 to derive Fixed Share 30 from User PIN 26.

As further shown in FIG. 1, the Fixed Share 30 is then passed to Token Seed Splitting and Reconstruction Logic 34. Token Seed Splitting and Reconstruction Logic 34 uses a secret sharing technique to split the Token Seed 32 into a set of three shares that includes Fixed Share 30, shown in FIG. 1 by Share Set 36. As shown in FIG. 1, Share Set 36 is made up of Fixed Share 30, Remote Share 38, and Local Share 40. Token Seed Splitting and Reconstruction Logic 34 may, for example, use a polynomial-based secret sharing technique to split Token Seed 32 into Share Set 36, such that any two of the resulting shares in Share Set 36 must be combined to reconstruct Token Seed 32. For example, Token Seed Splitting and Reconstruction Logic 34 may be embodied such that Token Seed 32 is split using a (k, n) threshold scheme, in which Token Seed 32 is split into n shares, such that (i) any k or more different shares are necessary to reconstruct Token Seed 32, and (ii) Token Seed 32 cannot by determined based on k-1 or fewer key shares. Examples of specific polynomial-based secret sharing techniques that may be used in the disclosed system are described in "How to Share a Secret" by Adi Shamir, Communications of the ACM, November 1979, Volume 22, Number 11, all disclosures of which are hereby included herein by reference. In the illustrative embodiment shown in FIG. 1, the total number n of shares in Share Set 36 is three (i.e. Fixed Share 30, Remote Share 38, and Local Share 40), and the number k of different ones of the shares in Share Set 36 that must be combined to reconstruct Token Seed 32 is two. Those skilled in the art will recognize that the disclosed techniques are not limited to the specific values for k and n used in the examples herein, and that alternative embodiments may use other values for k and n, such as, for example, a value of five for n, and a value of three for k.

Token Seed Splitting and Reconstruction Logic 34 receives as input both Token Seed 32 and Fixed Share 30, and splits Token Seed 32 into a Share Set 36 that includes Fixed Share 30 as one of the shares therein. Accordingly, the input Fixed Share 30 is also one of the resulting shares, along with Remote Share 38 and Local Share 40, that may be combined in order to reconstruct Token Seed 32. One example of how a polynomial-based secret sharing technique may be used to generate a resulting set of shares such as Share Set 36 that includes a "fixed" input share such as Fixed Share 30 is described in U.S. patent application Ser. No. 14/577,206, filed Dec. 19, 2014, and entitled "Protection Of A Secret On A Mobile Device Using A Secret-Splitting Technique With A Fixed User Share", all disclosures of which are hereby included by reference herein.

After Share Set 36 is generated by Token Seed Splitting and Reconstruction Logic 34, Remote Share 38 may be stored on a remote server such as Authentication Server 100. For example, Remote Share 38 may be stored on Authentication Server 100 by first passing Remote Share 38 to Remote Share Encryption/Decryption Logic 42, which encrypts Remote Share 38 to generate Encrypted Remote Share 44. The encryption of Remote Share 38 by Remote Share Encryption/Decryption Logic 42 may include or consist of performing a key wrapping operation on Remote Share 38 using Local Share 40 as the wrapping/encryption key, in order to generate Encrypted Remote Share 44. Encrypted Remote Share 44 may then be stored on Authentication Server 100, e.g. by transmitting Encrypted Remote Share 44 from User Device 10 to Authentication Server 100 using a secure communication channel.

Local Share 40 is also passed to Local Share Encryption/Decryption Logic 43. Local Share Encryption/Decryption Logic 43 encrypts Local Share 40 to generate Encrypted Local Share 45. The encryption of Local Share 40 by Local Share Encryption/Decryption Logic 43 may include or consist of performing a key wrapping operation on Local Share 40 using Key Wrap Key 33 as the wrapping/encryption key, in order to generate Encrypted Local Share 45. Key Wrap Key 33 may, for example, be an encryption key that is unique to User Device 10, and securely stored within User Device 10. Encrypted Local Share 45 may then be stored on User Device 10.

The key-wrapping performed by Remote Share Encryption/Decryption Logic 42 to encrypt Remote Share 38 using Local Share 40, and performed by Local Share Encryption/Decryption Logic 43 to encrypt Local Share 40 using Key Wrap Key 33, may, for example, be accomplished using a key wrapping technique. Appropriate key wrapping techniques may, for example, include symmetric encryption algorithms. Examples of such techniques include those described in the Advanced Encryption Standard (AES) Key Wrap Specification, and/or in American Standards Committee ANSX9.102. Accordingly, after the Remote Share 38 is wrapped using the Local Share 40 generate Encrypted Remote Share 44, the Local Share 40 is required in order to unwrap Encrypted Remote Share 44 in order to generate Remote Share 38. Similarly, after the Local Share 40 is wrapped using Key Wrap Key 33, Key Wrap Key 33 is required in order to unwrap Encrypted Local Share 45 in order to generate Local Share 40.

After the Remote Share 38 has been stored on Authentication Server 100 (e.g. Encrypted Remote Share 44 has been generated and transmitted to Authentication Server 100), and after Encrypted Local Share 45 has been generated and stored in User Device 10, Authentication Client 23 may discard Token Seed 32, Fixed Share 30, Remote Share 38, and Local Share 40, for example by deleting all copies of Token Seed 32, Fixed Share 30, Remote Share 38, and Local Share 40 from Memory 20 in User Device 10. Advantageously, because Token Seed 32 is then no longer stored on User Device 10, improper acquisition (e.g. theft) of User Device 10 will not result in Token Seed 32 being acquired by a malicious party seeking to fraudulently access a secure resource protected by Authentication Server 100.

Figure 2:
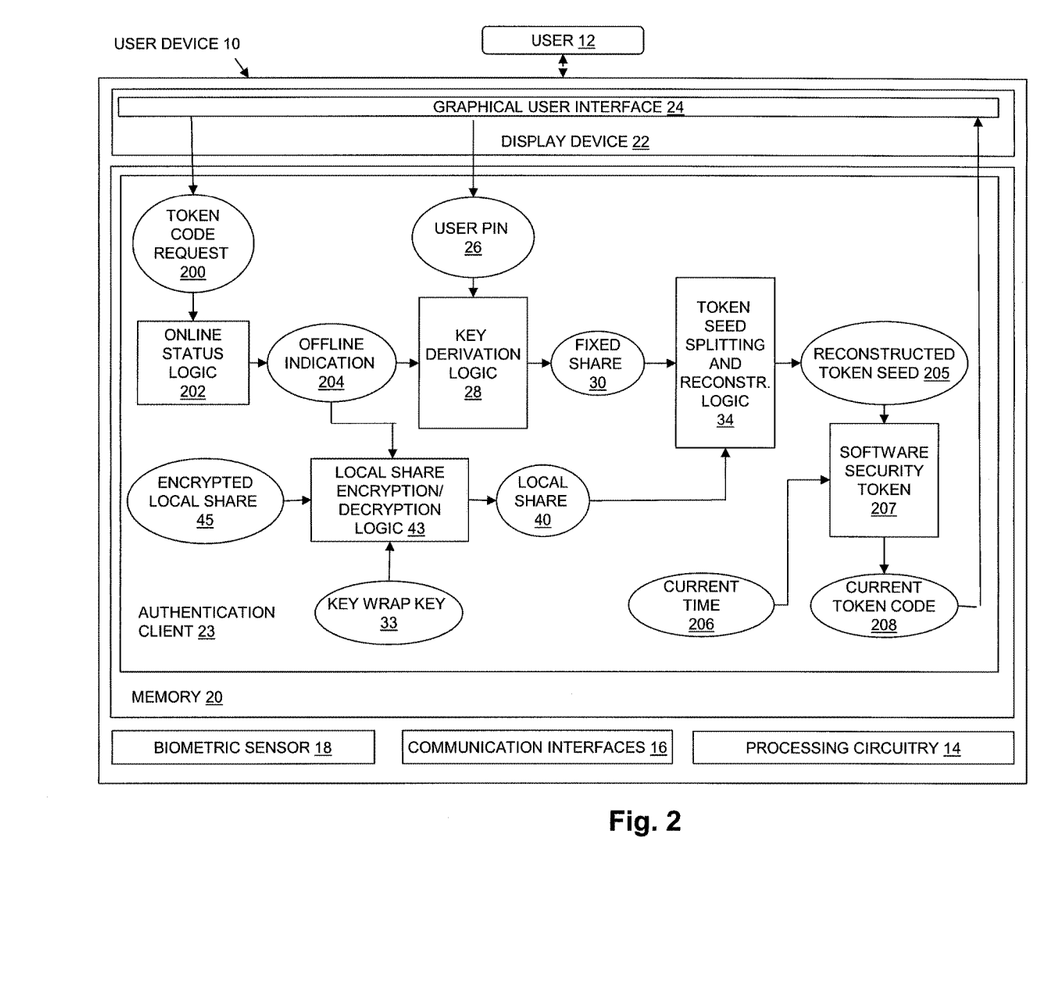
FIG. 2 is a block diagram showing an example of components in an illustrative embodiment operating to reconstruct a token seed when the user device is offline.

After the Token Seed 32 has been split, and the Token Seed 32, Fixed Share 30, Remote Share 38 and Local Share 40 have been deleted from Memory 20, a current token code may be still be generated by first reconstructing the Token Seed 32 on User Device 10. The token seed may be reconstructed differently depending on whether the User Device 10 is currently online or offline. FIG. 2 is a block diagram showing an example of how components in an illustrative embodiment may operate to reconstruct Token Seed 32 when User Device 10 is offline. As shown in FIG. 2, the components of Authentication Client 23 may further include Online Status Logic 202 and Software Security Token 207.

During operation of the components shown in FIG. 2, a Token Code Request 200 may be received by Authentication Client 23, e.g. from User 12 through Graphical User Interface 24. For example, User 12 may issue Token Code Request 200 when User Device 100 is offline in order to generate a current token code that can be used to authenticate User 12 through another device. Various other devices may require a current token code to authenticate User 12, such as another computer or electronic device that is currently online, an ATM machine, a check-in kiosk at an airport, a vending machine, etc. Moreover, User Device 10 may be disconnected from the network for many reasons. For example, in an embodiment in which User Device 10 is a mobile phone, the owner of User Device 10 (e.g. User 12) may be traveling overseas with User Device 10, and not wish to incur data roaming charges. In another example, the user of User Device 10 may purchase Wi-Fi access on a flight for their laptop computer, but not want to make a second Wi-Fi purchase for User Device 10 simply to obtain a current token code through User Device 10 that is needed to unlock the laptop computer and/or access a Virtual Private Network (VPN) using the laptop computer.

Another example of when a user of User Device 10 may issue Token Code Request 200 when User Device 100 is offline is when a current token code is required in order to access a secure local resource, e.g. a secure resource contained in User Device 10. Examples of such a local resource contained in User Device 10 include, without limitation, a secure wallet or vault application used to protect sensitive and private information, and that can only be unlocked by submission of a valid current token code.

As further shown in FIG. 2, in response to receipt of the Token Code Request 200, Online Status Logic 202 determines whether User Device 10 is currently online. For example, Online Status Logic 202 may determine whether User Device 10 is currently online by determining whether User Device 10 is currently connected to a network. In response to detecting that User Device 10 is currently offline, Online Status Logic 202 issues Offline Indication 204, which causes Authentication Client 23 to prompt User 12 to enter their personal identification number. Authentication Client 23 then receives the user's personal identification number through Graphical User Interface 24, shown by User PIN 26, and passes User PIN 26 to Key Derivation Logic 28. Key Derivation Logic 28 derives Fixed Share 30 from User PIN 26 using the same key derivation function used when the token seed was originally split, e.g. either PBKDF2 or SCRYPT.

Offline Indication 204 also causes Local Share Encryption/Decryption Logic 43 to retrieve Encrypted Local Share 45 from internal storage of User Device 10, and to generate Local Share 40 by decrypting Encrypted Local Share 45 using the Key Wrap Key 33. Fixed Share 30 and Local Share 40 are then passed to Token Seed Splitting and Reconstruction Logic 34, which uses Fixed Share 30 and Local Share 40 to reconstruct the original token seed, as shown in FIG. 2 by Reconstructed Token Seed 205. The Reconstructed Token Seed 205 is then passed to Software Security Token 207 along with a Current Time 206. Software Security Token 207 then uses Reconstructed Token Seed 205 and Current Time 206 to generate Current Token Code 208.

Current Token Code 208 may then be displayed to the user of User Device 10 through Graphical User Interface 24, so that User 12 can enter Current Token Code 208 into another device (not shown), in order to be authenticated using the other device and gain access to a secure network resource. Alternatively, Current Token Code 208 may be passed directly to the other device from User Device 10, e.g. through a USB connection between User Device 10 and the other device, a Bluetooth connection to the other device, etc. In another example, Current Token Code 208 may be passed to local identity verification logic (not shown) within User Device 10 that will authorize access to a secure resource located within User Device 10 only after validating Current Token Code 208, e.g. by comparison with a current token code generated using another copy of Token Seed 32 that is only available to the internal identity verification logic.

Figure 3:
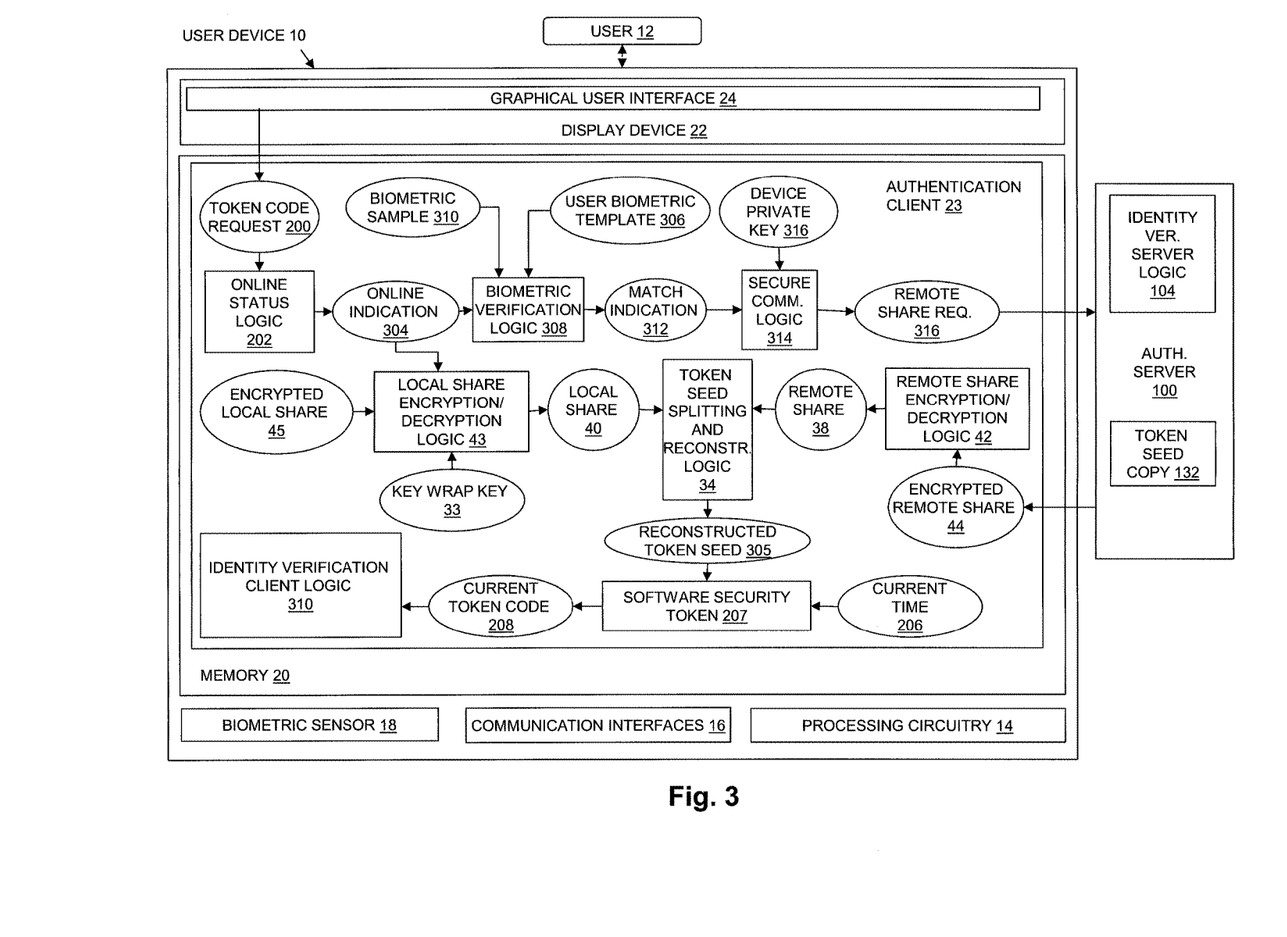
FIG. 3 is a block diagram showing an example of components in an illustrative embodiment operating to reconstruct a token seed when the user device is online.

FIG. 3 is a block diagram showing an example of components in an illustrative embodiment operating to reconstruct Token Seed 32 when the User Device 10 is online. In the embodiment of FIG. 3, the components of Authentication Client 23 may further include Biometric Verification Logic 308, Secure Communication Logic 314, and Identity Verification Client Logic 310.

As shown in FIG. 3, Token Code Request 200 may be received by Authentication Client 23, e.g. from User 12 through Graphical User Interface 24. For example, User 12 may cause Token Code Request 200 to be issued when User Device 100 is online in order for User 12 to access a secure network resource through User Device 10. In response to receipt of Token Code Request 200, Online Status Logic 202 determines whether User Device 10 is currently online. In response to detecting that User Device 10 is currently online, Online Status Logic 202 issues Online Indication 304, which causes Authentication Client 23 to prompt User 12 (e.g. through Graphical User Interface 24) to provide a biometric sample through Biometric Sensor 18. The biometric sample input by User 12 is shown as Biometric Sample 310, which is passed to Biometric Verification Logic 308. Biometric Verification Logic 308 compares Biometric Sample 310 to User Biometric Template 308. Biometric Template 308 includes one or more distinct biometric characteristics that uniquely identify the owner or other authorized user of User Device 10. If Biometric Sample 310 matches User Biometric Template 308, Biometric Verification Logic 308 passes Match Indication 312 to Secure Communication Logic 314. In response to receipt of Match Indication 312, Secure Communication Logic 314 uses Device Private Key 316 to authenticate User Device 10 to Authentication Server 100 and establish a secure communication connection with Authentication Server 100. A secure communication connection between User Device 10 and Authentication Server 100 may, for example, be provided using a tunneling protocol that includes encryption and authentication of User Device 10 to Authentication Server 100, based on transport layer network security such as Internet Protocol Security (IPSec), or a Virtual Private Network (VPN) through Secure Sockets Layer (SSL).

Secure Communication Logic 314 then transmits a request for the encrypted version of the remote share to Authentication Server 100, shown in FIG. 1 by Remote Share Request 316, over the secure communication connection established with Authentication Server 100. In response to receipt of the Remote Share Request 316 and authentication of User Device 10, Authentication Server 100 retrieves Encrypted Remote Share 44 from internal storage of Authentication Server 100, and transmits Encrypted Remote Share 44 to User Device 10.

Online Indication 204 also causes Local Share Encryption/Decryption Logic 43 to retrieve Encrypted Local Share 45 from internal storage of User Device 10, and to generate Local Share 40 by decrypting (e.g. unwrapping) Encrypted Local Share 45 using the Key Wrap Key 33.

When Encrypted Remote Share 44 is received by User Device 10, Authentication Client 23 passes Encrypted Remote Share 44 to Remote Share Encryption/Decryption Logic 42, which uses Local Share 40 to generate Remote Share 38 by decrypting (e.g. unwrapping) Encrypted Remote Share 44 using Local Share 40.

Local Share 40 and Remote Share 38 are then passed to Token Seed Splitting and Reconstruction Logic 34, which uses Local Share 40 and Remote Share 38 to reconstruct the original token seed, as shown in FIG. 3 by Reconstructed Token Seed 205. The Reconstructed Token Seed 205 is then passed to Software Security Token 207 along with a Current Time 206. Software Security Token 207 then uses Reconstructed Token Seed 205 and Current Time 206 to generate Current Token Code 208. Current Token Code 208 may then be passed to Identity Verification Client Logic 310, which uses Current Token Code 208 to authenticate User 12 using Authentication Server 100. Authenticating User 12 using Authentication Server 100 may, for example, include Identity Verification Client Logic 310 transmitting Current Token Code 208 to Authentication Server 100, and Identity Verification Server Logic 104 validating Current Token Code 208 by comparing Current Token Code 208 with a current token code that is generated by Identity Verification Server Logic 104 using Token Seed Copy 132 at the time that Current Token Code 208 is received from User Device 10. User 12 is only authenticated in the event that Identity Verification Server Logic 104 determines that Current Token Code 208 matches the token code generated by Identity Verification Server Logic 104 using Token Seed Copy 132 at the time that Current Token Code 208 is received from User Device 10.

Figure 4:
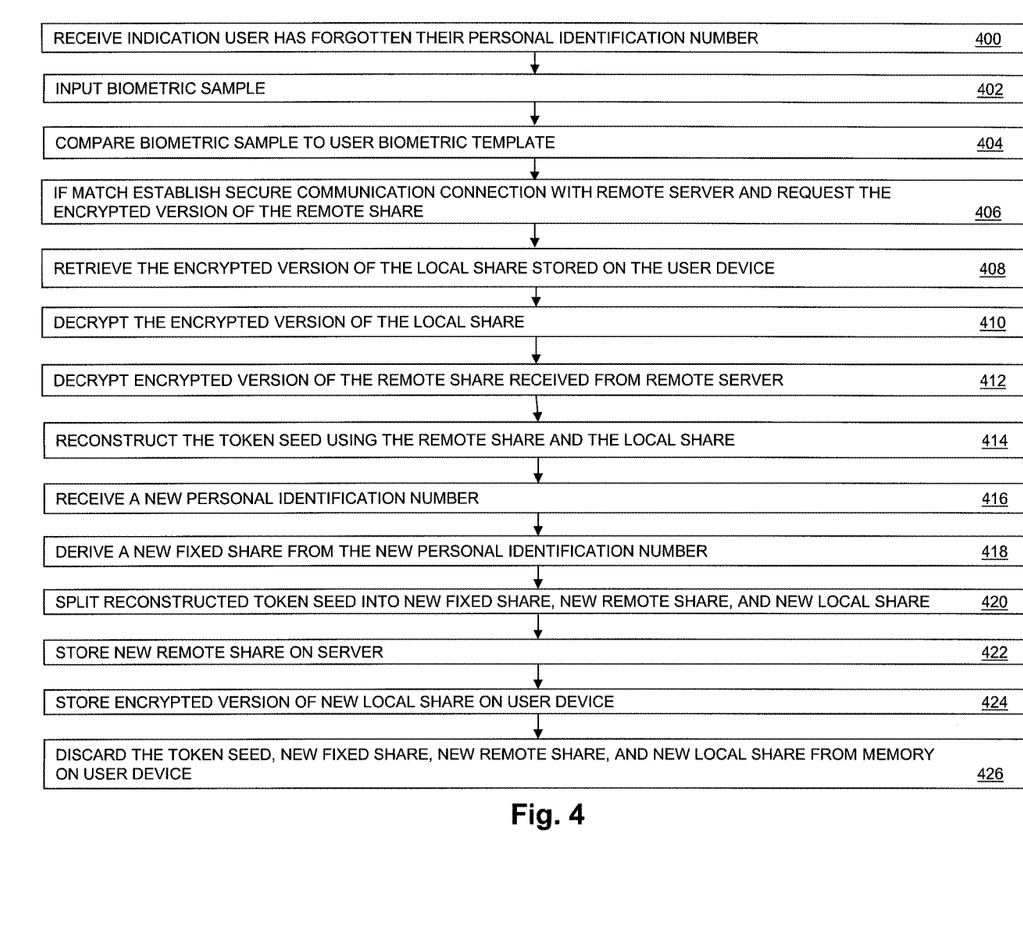
FIG. 4 is a flow chart showing steps performed by components in an illustrative embodiment operating in response to an indication that the user of the user device has forgotten their personal identification number.

FIG. 4 is a flow chart showing steps performed by components in an illustrative embodiment operating in response to an indication that the user of the user device has forgotten their personal identification number. The steps of FIG. 4 may, for example, be performed by the Authentication Client 23.

At step 400, an indication is received that the user has forgotten their personal identification number. For example Authentication Client 23 may receive such an indication through Graphical User Interface 48. At step 402, the Authentication Client 23 prompts the user to input a biometric sample, e.g. through Biometric Sensor 20. At step 404, the biometric sample is compared to a biometric template for the owner or other authorized user of User Device 10, for example using Biometric Verification Logic 308. At step 406, if there is a match between the biometric sample and the biometric template, a secure communication connection is established (e.g. using Secure Communication Logic 314) with a remote server (e.g. Authentication Server 100), and the encrypted remote share is requested from the remote server. At step 408, Authentication Client 23 retrieves the encrypted version of the local share from storage on the user device, and at step 410, decrypts the encrypted version of the local share, e.g. using a key wrapping key uniquely associated with the user device. Then at step 412, Authentication Client 23 decrypts the encrypted version of the remote share received from the remote server using the decrypted local share. The Authentication Client 23 reconstructs the token seed using the remote share and the local share at step 414 (e.g. using Token Seed Splitting and Reconstruction Logic 34).

The Authentication Client 23 then prompts the user for a new personal identification number, and receives and confirms the new personal identification number with the user at step 416. At step 418 the Authentication Client 23 derives a new fixed share from the new personal identification number, e.g. using Key Derivation Logic 28. The Authentication Client 23 splits the reconstructed token seed at step 420 using the new fixed share as an input to generate a share set containing the new fixed share, a new remote share, and a new local share. At step 422, Authentication Client 23 stores the new remote share on the remote server. For example, the Authentication Client 23 may store an encrypted version of the new remote share on remote server, such that the encrypted version of the new remote is the remote share wrapped using the new local share. An encrypted (e.g. wrapped) version of the new local share is then stored on the user device at step 424, and at step 426 the token seed, new fixed share, new remote share, and new local share are all discarded from the user device (e.g. deleted from the memory of the user device).

The steps of FIG. 4 may be modified to handle the case in which the user of the user device simply wishes to reset their personal identification number. For example, in the event that the user of the user device indicates that they wish to reset their personal identification number (e.g. through Graphical User Interface 24), Authentication Client 23 may prompt the user for their old personal identification number, derive the fixed share from the old personal identification number, decrypt the encrypted local share, and reconstruct the token seed using the fixed share and local share. The steps of FIG. 4 beginning with step 416 may then be used to prompt the user for the new personal identification number, derive a new fixed share from the new personal identification number, and so on, as described above with reference to steps 418 through 426 of FIG. 4.

In the event that the user device is lost and must be replaced, the disclosed techniques may be embodied such that the token seed can be reconstructed when the user acquires a new user device (e.g. acquires a new mobile phone). In such an embodiment, the remote share is not encrypted using the local share prior to being transmitted to the remote server. For example, when the user acquires the new device, Authentication Client 23 executing on the new device may prompt the user for their personal identification number. Authentication Client 23 may then generate the fixed share using the user's personal identification number (e.g. using Key Derivation Logic 28), establish a secure connection with the remote server (e.g. using Secure Communication Logic 314), and request the remote share from the remote server. Since the remote share is not wrapped using the local share (which has been lost with the lost device), the received remote share and fixed share can then be used to reconstruct the token seed, e.g. using Token Seed Splitting and Reconstruction Logic 34.

Figure 5:
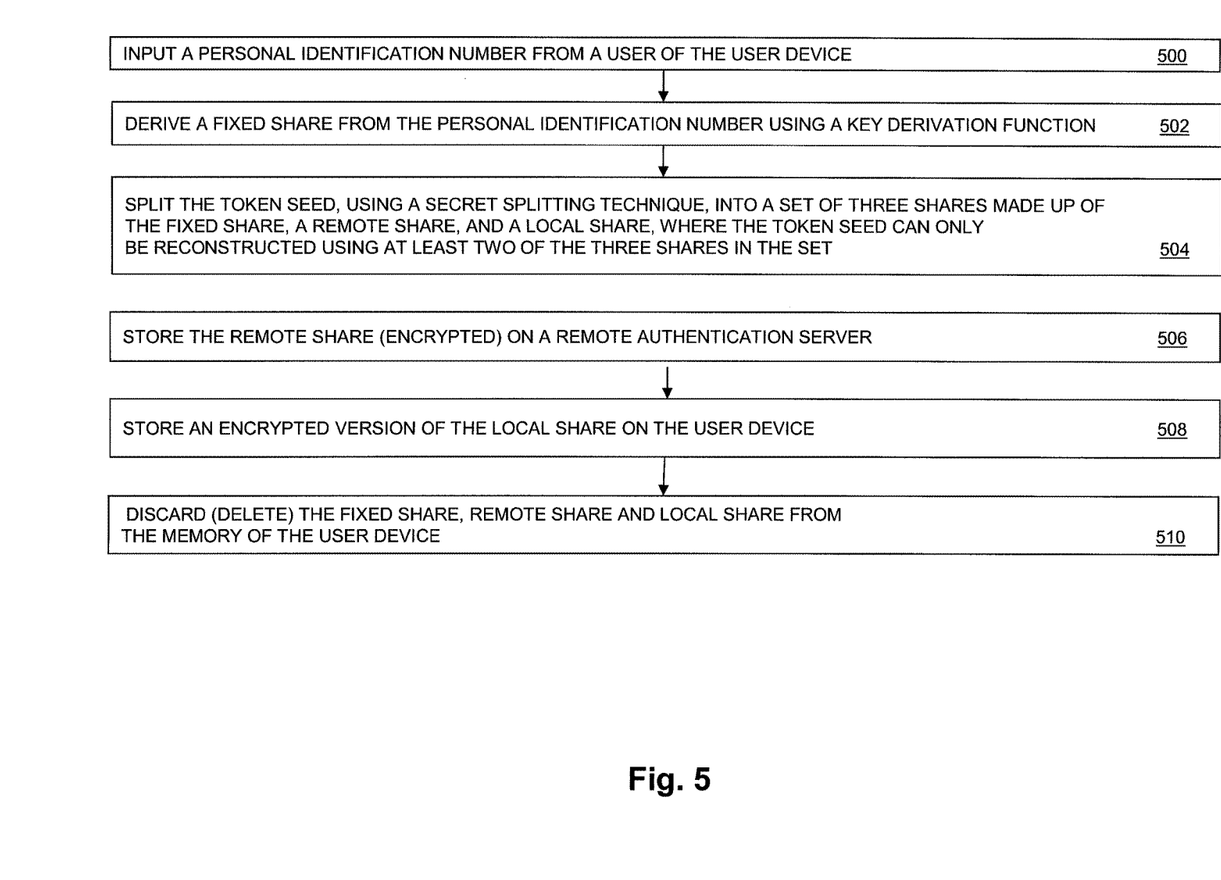
FIG. 5 is a flow chart showing steps performed by components in an illustrative embodiment operating to protect a token seed.

FIG. 5 is a flow chart showing steps performed by components in an illustrative embodiment to protect a token seed in a multifactor authentication system. At step 500, a personal identification is input from a user of a user device. At step 502, a fixed share is derived from the received personal identification number using a key derivation function. At step 504, a token seed in the user device is split, using a secret sharing technique, into a set of three shares made up of the fixed share, a remote share, and a local share, such that the token seed can only be reconstructed using at least two of the three shares. At step 506, the remote share is stored on a remote server. The remote share may be encrypted prior to storage on the remote server, for example by wrapping the remote share using the local share. At step 508 the local share is encrypted, e.g. using a key wrapping key unique to the user device, and the encrypted version of the local share is stored within the user device. At step 510 the fixed share, remote share and local share may all be deleted from the memory of the user device.

The disclosed techniques may be embodied to provide significant advantages over previous approaches. For example, embodiments of the disclosed techniques advantageously to do not rely on device native methods of protecting the token seed on the user device, thus avoiding compromised security resulting when such device native methods of protection are disabled by the user. Also, embodiments of the disclosed techniques need not rely on password based encryption, and accordingly that provide the capability of using biometric based approaches. In addition, since the token seed is not stored completely on the user device, theft of the user device is less likely to result in the token seed being compromised. The disclosed techniques may also enable the token seed to be conveniently reconstructed even in the cases where the user device is offline, is wiped or replaced, and/or when the user has forgotten or wishes to reset their personal identification number.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above. For example, while in the above examples an Authentication Server 100 is used to store the Encrypted Remote Share 44, those skilled in the art will recognize that an authentication server is just one example of a remote server that may be used to store Encrypted Remote Share 44, and that the disclosed techniques are not limited to use of an authentication server in this regard. For example, another remote server other than an authentication server, such as a cloud server or the like, may be specifically provided for storing encrypted remote shares such as Encrypted Remote Share 44, authenticating user devices such as User Device 10 when the encrypted remote shares are requested, and returning an encrypted remote share to a user device only when that user device is successfully authenticated. Such a remote server may also be embodied to include or consist of one or more physical server computer systems, or alternatively as one or more virtual private servers (VPSs), such as one or more cloud servers or the like.

In another example, while in the above examples an individual token seed is protected using the disclosed techniques, those skilled in the art will recognize that the disclosed techniques may alternatively be embodied such that multiple token seeds may be protected simultaneously. For example a database key wrapping key used to encrypt multiple token seeds associated with a user may be split into three shares as disclosed herein, and a combination of two of the resulting shares then required to be used to reconstruct the database key wrapping key in order to decrypt and access one or more of the multiple token seeds stored in the database. For example, a key wrapping key used to encrypt a token seed database containing multiple token seeds in a user device may be split, and the resulting shares distributed using the disclosed techniques.

In another example, while in the above examples reference is made to two-factor authentication systems in which a current token code is generated at fixed intervals using a built-in clock and the token seed, and in which the user must provide, to the authentication server, as one of the two authentication credentials, a current token code generated using the token seed for the user's security token at the current time, the disclosed techniques are not limited in applicability to systems that use a current time as a moving factor when generating token codes using a token seed. Alternatively, the disclosed techniques may be applied to other systems that generate token codes using a token seed together with a moving factor other than the current time. For example, the disclosed techniques may be applied to protect a token seed in systems in which token codes are generated based on the token seed and a moving factor consisting of a sequence number that is known to both the security token and the authentication server. In another example, the disclosed techniques may be applied to protect a token seed in systems in which token codes are generated based on the token seed and a moving factor consisting of a random challenge, the random challenge being made up of a number or string of characters that is generated by the authentication server and sent from the authentication to the security token to enable the security token to generate the current token code, and that may then be used by the authentication server in combination with the authentication server copy of the token seed to verify the token code received from the security token.

In another example, while in the above examples reference is made to storing the remote share on a remote server, the remote share may be stored in any medium that is outside the boundaries of the user device environment. For example, a second user device, such as a desktop computer, or a wearable device, such as a watch, may be used to store the remote share. Also, while reference is made above to storing an encrypted version of the local share on the user device, the local share may, when possible, be stored in a secure hardware module or a hardware protected module of the user device, such as a secure element (SE), a trusted execution environment (TEE), or a secure enclave within the user device.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of protecting a token seed, the method comprising:
  inputting, by a user device, a personal identification number from a user of the user device;
  deriving a fixed share from the input personal identification number using a key derivation function;
  splitting the token seed, using a secret sharing technique, into a set of three shares made up of the fixed share, a remote share, and a local share, wherein the token seed can only be reconstructed using any two of the three shares;

storing the remote share on a remote server at least in part by i) generating an encrypted version of the remote share by performing a key wrapping operation on the remote share using the local share as a key wrapping key, and ii) storing the encrypted version of the remote share on the remote server;

storing an encrypted version of the local share on the user device;

discarding the token seed, fixed share, remote share and local share from the user device; and after the token seed has been discarded from the user device, i) generating a current token code by reconstructing the token seed on the user device using two of the three shares and generating the current token code using the reconstructed token seed, and ii) accessing a secure resource from the user device by presenting the current token code to an authentication server that is responsible for controlling access to the secure resource.

2. The method of claim 1, wherein storing the encrypted version of the local share on the user device comprises:

generating a wrapped version of the local share by performing a key wrapping operation on the local share using a key wrapping key that is unique to the user device; and storing the wrapped version of the local share on the user device.

3. The method of claim 2, and further comprising generating the current token code by:

determining whether the user device is online or offline; and in response to detecting that the user device is offline, reconstructing the token seed on the user device by a) inputting the personal identification number from the user of the user device, b) deriving the fixed share from the input personal identification number using the key derivation function, c) generating the local share by decrypting the encrypted version of the local share, d) reconstructing the token seed using the fixed share and the local share, and e) generating a current token code using the reconstructed token seed and a current time.

4. The method of claim 2, and further comprising generating the current token code by:

determining whether the user device is online or offline; and in response to detecting that the user device is online, reconstructing the token seed on the user device by a) inputting a biometric sample from the user of the user device, b) in response to the biometric sample matching a biometric template of an authorized user for the user device, establishing a secure communication connection between the user device and the remote server, c) retrieving the encrypted version of the remote share from the remote server over the secure communication connection between the user device and the remote server, d) decrypting the encrypted version of the local share by unwrapping the encrypted version of the local share using the key wrapping key that is unique to the user device, e) decrypting the encrypted version of the remote share by unwrapping the encrypted version of the remote share using the local share, f) reconstructing the token seed using the remote share and the local share, and g) generating a current token code using the reconstructed token seed and a current time.

5. The method of claim 1, further comprising:

receiving an indication that the user of the user device has forgotten their personal identification number; and in response to the indication that the user of the user device has forgotten their personal identification number, a) inputting a biometric sample from the user of the user device, b) in response to the biometric sample matching a biometric template for an authorized user of the user device, establishing a secure communication connection between the user device and the remote server, c) retrieving the encrypted version of the remote share from the remote server over the secure communication connection between the user device and the remote server, d) decrypting the encrypted version of the local share by unwrapping the encrypted version of the local share using the key wrapping key that is unique to the user device, e) decrypting the encrypted version of the remote share by unwrapping the encrypted version of the remote share using the local share, f) reconstructing the token seed using the remote share and the local share, g) receiving a new personal identification number, h) deriving a new fixed share from the new personal identification number using the key derivation function, i) splitting the token seed, using the secret sharing technique, into a set of three shares made up of the new fixed share, a new remote share, and a new local share, wherein the token seed can only be reconstructed using any two of the three shares, j) storing the new remote share on the remote server, k) storing an encrypted version of the new local share on the user device, and l) discarding the token seed, new fixed share, new remote share and new local share from the user device.

6. The method of claim 1, further comprising, after the token seed has been discarded from the user device, subsequently reconstructing the token seed by:

at a first time while the user device is offline by i) deriving the fixed share from the personal identification number as input again from the user, ii) decrypting the encrypted version of the local share, and iii) reconstructing the token seed using the fixed share and the local share, and at a second time while the user device is online and the user has forgotten the personal identification number by i) retrieving the encrypted version of the remote share from the remote server, ii) decrypting the encrypted version of the local share, iii) decrypting the encrypted version of the remote share using the local share, and iv) reconstructing the token seed using the remote share and the local share.

7. The method of claim 1, further comprising, after the token seed has been discarded from the user device, and without maintaining a complete copy of the token seed within the user device, reconstructing the token seed both i) at times when the user device is offline, and ii) at other times when the user device is online and the user has forgotten the personal identification number.

8. An electronic device, comprising:

memory; and processing circuitry coupled to the memory, the memory storing program code for protecting a token seed which, when executed by the processing circuitry, causes the processing circuitry to:

input a personal identification number from a user of the electronic device, derive a fixed share from the input personal identification number using a key derivation function, split the token seed, using a secret sharing technique, into a set of three shares made up of the fixed share, a remote share, and a local share, wherein the token seed can only be reconstructed using any two of the three shares, store the remote share on a remote server at least in part by causing the processing circuitry to i) generate an encrypted version of the remote share by performing a key wrapping operation on the remote share using the local share as a key wrapping key, and ii) store the encrypted version of the remote share on the remote server, store an encrypted version of the local share on the electronic device, delete the token seed, fixed share, remote share and local share from the memory of the electronic device; and after the token seed has been discarded from the user device, i) generate a current token code by reconstructing the token seed on the user device using two of the three shares and generating the current token code using the reconstructed token seed, and ii) access a secure resource from the user device by presenting the current token code to an authentication server that is responsible for controlling access to the secure resource.

9. The electronic device of claim 8, wherein the program code, when executed by the processing circuitry, causes the processing circuitry to store the encrypted version of the local share on the electronic device by:

generating a wrapped version of the local share by performing a key wrapping operation on the local share using a key wrapping key that is unique to the electronic device; and storing the wrapped version of the local share on the electronic device.

10. The electronic device of claim 9, wherein the program code, when executed by the processing circuitry, further causes the processing circuitry to:

generate the current token code by causing the processing circuitry to:

determine whether the electronic device is online or offline, and in response to detecting that the electronic device is offline, reconstruct the token seed on the device by a) inputting the personal identification number from the user of the electronic device, b) deriving the fixed share from the input personal identification number using the key derivation function, c) generating the local share by decrypting the encrypted version of the local share, d) reconstructing the token seed using the fixed share and the local share, and e) generating a current token code using the reconstructed token seed and a current time.

11. The electronic device of claim 9, wherein the program code, when executed by the processing circuitry, further causes the processing circuitry to:

generate the current token code by causing the processing circuitry to:

determine whether the electronic device is online or offline, and in response to detecting that the electronic device is online, reconstruct the token seed on the device by a) inputting a biometric sample from the user of the electronic device, b) in response to the biometric sample matching a biometric template of an authorized user for the electronic device, establishing a secure communication connection between the electronic device and the remote server, c) retrieving the encrypted version of the remote share from the remote server over the secure communication connection between the electronic device and the remote server, d) decrypting the encrypted version of the local share by unwrapping the encrypted version of the local share using the key wrapping key that is unique to the electronic device, e) decrypting the encrypted version of the remote share by unwrapping the encrypted version of the remote share using the local share, f) reconstructing the token seed using the remote share and the local share, and g) generating a current token code using the reconstructed token seed and a current time.

12. The electronic device of claim 8, wherein the program code, when executed by the processing circuitry, further causes the processing circuitry to:

receive an indication that the user of the electronic device has forgotten their personal identification number; and in response to the indication that the user of the electronic device has forgotten their personal identification number, a) input a biometric sample from the user of the electronic device, b) in response to the biometric sample matching a biometric template for an authorized user of the electronic device, establish a secure communication connection between the electronic device and the remote server, c) retrieve the encrypted version of the remote share from the remote server over the secure communication connection between the electronic device and the remote server, d) decrypt the encrypted version of the local share by unwrapping the encrypted version of the local share using the key wrapping key that is unique to the electronic device, e) decrypt the encrypted version of the remote share by unwrapping the encrypted version of the remote share using the local share, f) reconstruct the token seed using the remote share and the local share, g) receive a new personal identification number, h) derive a new fixed share from the new personal identification number using the key derivation function, i) split the token seed, using the secret sharing technique, into a set of three shares made up of the new fixed share, a new remote share, and a new local share, wherein the token seed can only be reconstructed using any two of the three shares, j) store the new remote share on the remote server, k) store an encrypted version of the new local share on the electronic device, and l) delete the token seed, new fixed share, new remote share and new local share from the memory of the electronic device.

13. A computer program product having a non-transitory computer readable medium which stores a set of instructions operable to protect a token seed, the set of instructions, when executed by processing circuitry, causing the processing circuitry to:

input, by a user device, a personal identification number from a user of the user device;

derive a fixed share from the input personal identification number using a key derivation function;

split the token seed, using a secret sharing technique, into a set of three shares made up of the fixed share, a remote share, and a local share, wherein the token seed can only be reconstructed using any two of the three shares;

store the remote share on a remote server at least in part by causing the processing circuitry to i) generate an encrypted version of the remote share by performing a key wrapping operation on the remote share using the local share as a key wrapping key, and ii) store the encrypted version of the remote share on the remote server;

store an encrypted version of the local share on the user device;

discard the token seed, fixed share, remote share and local share from the user device; and after the token seed has been discarded from the user device, i) generate a current token code by reconstructing the token seed on the user device using two of the three shares and generating the current token code using the reconstructed token seed, and ii) access a secure resource from the user device by presenting the current token code to an authentication server that is responsible for controlling access to the secure resource.

14. The computer program product of claim 13, wherein the set of instructions operable to protect the token seed, when executed by processing circuitry, further cause the processing circuitry to:

store the encrypted version of the local share on the user device at least in part by causing the processing circuitry to i) generate a wrapped version of the local share by performing a key wrapping operation on the local share using a key wrapping key that is unique to the user device, and ii) store the wrapped version of the local share on the user device.

15. The computer program product of claim 14, wherein the set of instructions operable to protect the token seed, when executed by processing circuitry, further cause the processing circuitry to:

generate the current token code by causing the processing circuitry to:

determine whether the user device is online or offline; and in response to detecting that the user device is offline, reconstruct the token seed on the user device by a) inputting the personal identification number from the user of the user device, b) deriving the fixed share from the input personal identification number using the key derivation function, c) generating the local share by decrypting the encrypted version of the local share, d) reconstructing the token seed using the fixed share and the local share, and e) generating a current token code using the reconstructed token seed and a current time.

16. The computer program product of claim 14, wherein the set of instructions operable to protect the token seed, when executed by processing circuitry, further cause the processing circuitry to:

generate the current token code by causing the processing circuitry to:

determine whether the user device is online or offline; and in response to detecting that the user device is online, reconstruct the token seed on the user device by a) inputting a biometric sample from the user of the user device, b) in response to the biometric sample matching a biometric template of an authorized user for the user device, establishing a secure communication connection between the user device and the remote server, c) retrieving the encrypted version of the remote share from the remote server over the secure communication connection between the user device and the remote server, d) decrypting the encrypted version of the local share by unwrapping the encrypted version of the local share using the key wrapping key that is unique to the user device, e) decrypting the encrypted version of the remote share by unwrapping the encrypted version of the remote share using the local share, f) reconstructing the token seed using the remote share and the local share, and g) generating a current token code using the reconstructed token seed and a current time.

17. The computer program product of claim 13, wherein the set of instructions operable to protect the token seed, when executed by processing circuitry, further cause the processing circuitry to:

receive an indication that the user of the electronic device has forgotten their personal identification number; and in response to the indication that the user of the electronic device has forgotten their personal identification number, a) input a biometric sample from the user of the electronic device, b) in response to the biometric sample matching a biometric template for an authorized user of the electronic device, establish a secure communication connection between the electronic device and the remote server, c) retrieve the encrypted version of the remote share from the remote server over the secure communication connection between the electronic device and the remote server, d) decrypt the encrypted version of the local share by unwrapping the encrypted version of the local share using the key wrapping key that is unique to the electronic device, e) decrypt the encrypted version of the remote share by unwrapping the encrypted version of the remote share using the local share, f) reconstruct the token seed using the remote share and the local share, g) receive a new personal identification number, h) derive a new fixed share from the new personal identification number using the key derivation function, i) split the token seed, using the secret sharing technique, into a set of three shares made up of the new fixed share, a new remote share, and a new local share, wherein the token seed can only be reconstructed using any two of the three shares, j) store the new remote share on the remote server, k) store an encrypted version of the new local share on the electronic device, and l) delete the token seed, new fixed share, new remote share and new local share from the memory of the electronic device.

* * * * *